J. DOYLE & S. BAYLES.
VALVES FOR BASINS.
No. 179,003. Patented June 20, 1876.
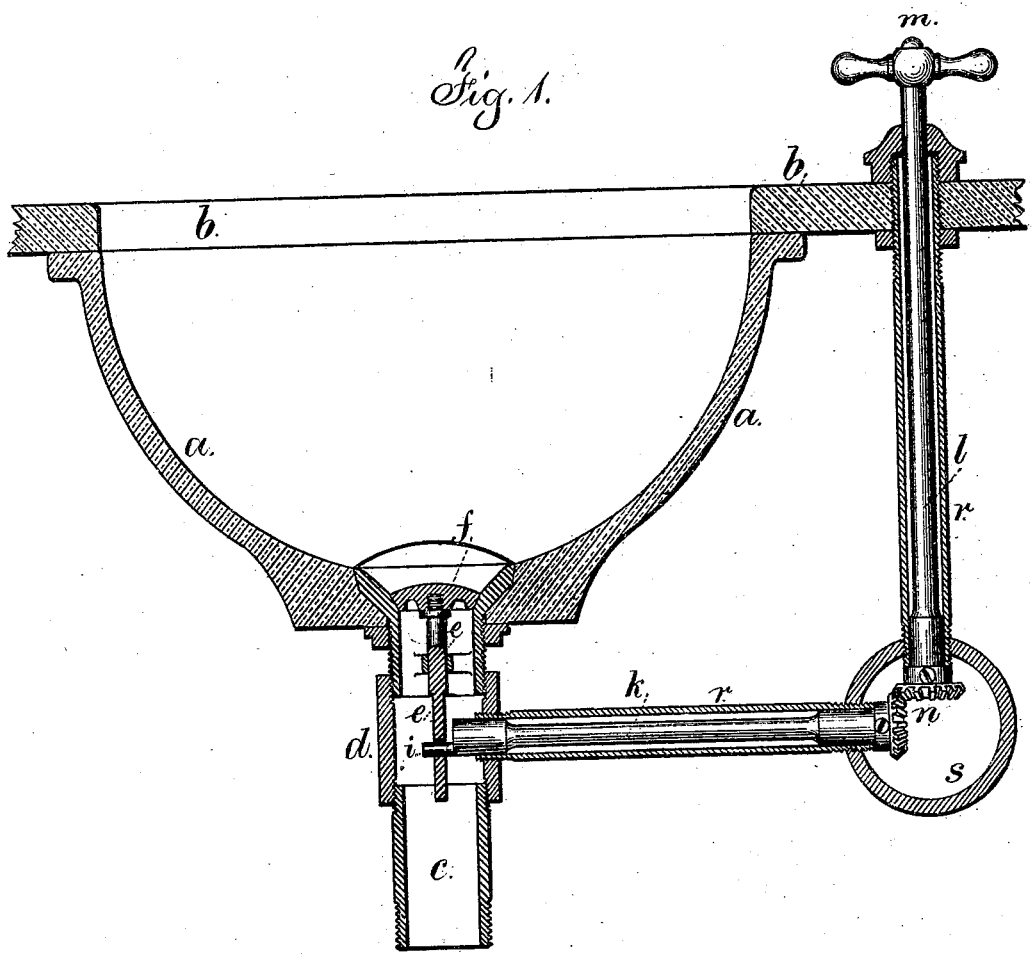
Fig. 1.
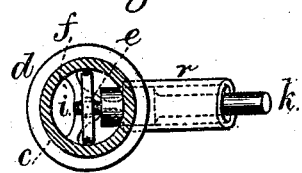
Fig. 2.
Witnesses
Chas. H. Smith
Harold Serrell
Inventors.
John Doyle.
Stephen Bayles
per Lemuel W. Serrell
atty.

UNITED STATES PATENT OFFICE.

JOHN DOYLE, OF HOBOKEN, NEW JERSEY, AND STEPHEN BAYLES, OF NEW YORK, N. Y.

IMPROVEMENT IN VALVES FOR BASINS.

Specification forming part of Letters Patent No. 179,003, dated June 20, 1876; application filed April 10, 1876.

*To all whom it may concern:*

Be it known that we, JOHN DOYLE, of Hoboken, in the county of Hudson and State of New Jersey, and STEPHEN BAYLES, of the city and State of New York, have invented an Improvement in Discharge-Valves for Basins, of which the following is a specification:

Discharge-valves for basins and baths have been fitted into a vertical pipe at the side of the basin, and operated by a handle above the slab surrounding the basin. A handle has also been connected from the slab at the side of the basin down to the valve at the center of the basin, where the plug is usually employed, so that the valve is operated by raising and lowering the handle. This construction allows of the usual basin and plug or valve being used, but causes said valve to be operated at the slab near the top of the basin, instead of being moved by hand within the basin.

We apply a crank within the discharge-pipe, to raise and lower the valve. Said crank is upon the end of a shaft that passes through a packing, and is connected by gearing with a shaft that passes nearly vertically through the slab, and terminates with a handle, so that the valve will be opened or closed by turning the handle.

In the drawing, Figure 1 is a vertical section of the basin, valve, and operating mechanism. Fig. 2 is a plan of the valve and stem inverted, and section of the waste-pipe.

The basin $a$ is of ordinary character, and connected to the slab $b$. $c$ is the discharge or waste pipe, connected to the lower part of the basin by a coupling-tube, $d$, and within this tube $d$ is the stem $e$ of the valve $f$, which stem is provided with guide-wings, to keep the valve central, but allow it to be moved up and down vertically by the crank-pin $i$, that is upon the end of the shaft $k$. It is preferable to employ a packing-gland around this shaft $k$, and to have the shaft of a size sufficient to allow of the crank-pin being at the end thereof. The shaft $k$ is geared to the vertical shaft $l$ by the miter-gears $n$, and the upper end of the shaft $l$ passes through the slab $b$, and terminates as a handle, $m$.

It is preferable to support the shafts $k$ $l$ in the tubular and ring bearing $r$ and $s$, so as to keep the miter-wheels properly in gear with each other, as shown.

We claim as our invention—

1. The combination, with the basin and the valve thereof in the bottom, of the crank-pin and connection from the same to a handle above the basin-slab, substantially as set forth.

2. The shafts $k$ and $l$, united by the miter-gears and sustained in the bearings $r$ $s$, in combination with the handle $m$, the crank-pin $i$, the valve $f$, and the basin $a$, substantially as set forth.

Signed by us this 4th day of April, A. D. 1876.

JOHN DOYLE.
STEPHEN BAYLES.

Witnesses:
HAROLD SERRELL,
CHAS. H. SMITH.